United States Patent [19]

Kanno et al.

[11] Patent Number: 5,687,252

[45] Date of Patent: Nov. 11, 1997

[54] IMAGE PROCESSING APPARATUS

[75] Inventors: Hiroki Kanno; Gururaj Rao, both of Yokohama, Japan

[73] Assignee: Kabushiki Kaisha Toshiba, Kawasaki, Japan

[21] Appl. No.: 640,718

[22] Filed: May 1, 1996

[30] Foreign Application Priority Data

May 16, 1995 [JP] Japan ................. 7-117458

[51] Int. Cl.$^6$ ............... G06K 9/34; G06K 9/36; G06K 9/46
[52] U.S. Cl. ............................. 382/176; 382/257
[58] Field of Search ..................... 382/176, 177, 382/257, 180; 358/462

[56] References Cited

U.S. PATENT DOCUMENTS

| | | | |
|---|---|---|---|
| 5,296,939 | 3/1994 | Suzuki | 358/462 |
| 5,335,290 | 8/1994 | Cullen et al. | 382/176 |
| 5,465,304 | 11/1995 | Cullen et al. | 382/176 |

OTHER PUBLICATIONS

K.Y. Wong et al., "Document Analysis System", IBM J. Res. Develop. 26(6): 647–656 (1982).

*Primary Examiner*—Scott A. Rogers
*Attorney, Agent, or Firm*—Foley & Lardner

[57] ABSTRACT

A binarization circuit binarizes a pixel signal indicative of an input image, using binarizing processing capable of preserving a gradation of a photograph image. A run expansion circuit performs processing for expanding black pixels included in a binary image to obtain runs, and outputting a run expansion signal. A labelling circuit integrates connected runs into an integrated region (a label) by means of a circumscribing-rectangle extraction circuit, and obtains the position and the size of a rectangle which circumscribes each integrated region, thereby outputting the obtained data as circumscribing-rectangle data. A determination circuit determines whether the integrated region is a text region or a photograph (continuous) region from the size and the configuration of the circumscribing rectangle, and outputs a determination signal.

7 Claims, 9 Drawing Sheets

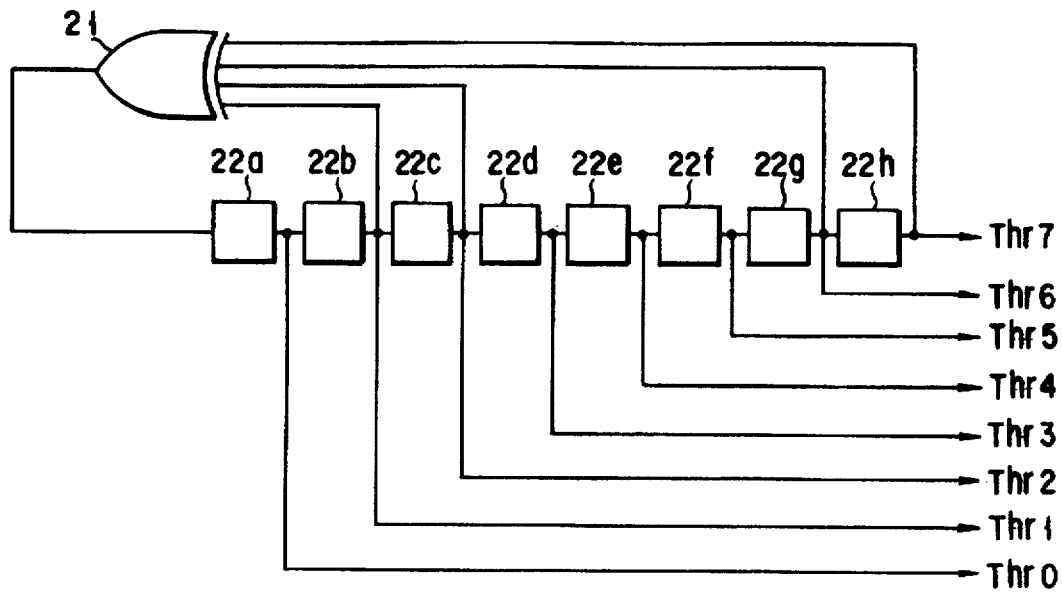
F I G. 6
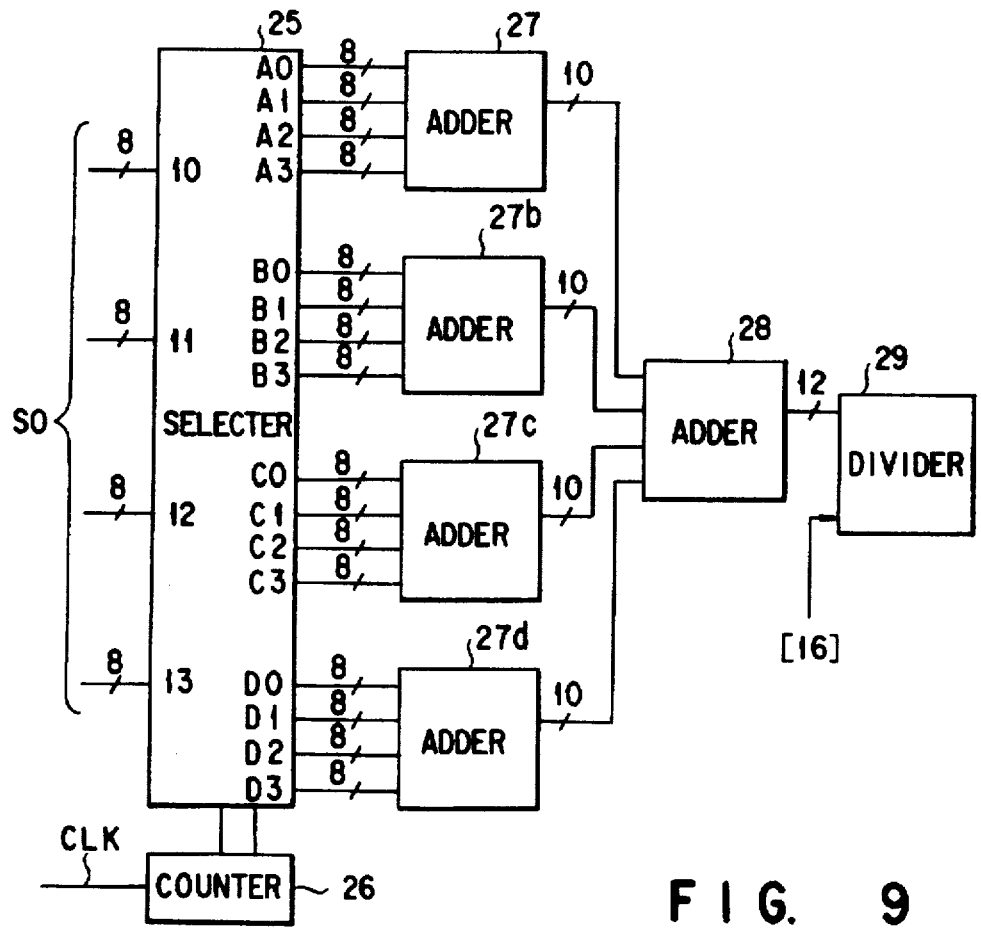
F I G. 9

|   | 0 | 1 | 2 | 3 |
|---|---|---|---|---|
| 0 | 90 | 90 | 90 | 90 |
| 1 | 90 | 90 | 90 | 90 |
| 2 | 90 | 90 | 90 | 90 |
| 3 | 90 | 90 | 90 | 90 |

FIG. 7A

|   | 0 | 1 | 2 | 3 |
|---|---|---|---|---|
| 0 | 16 | 144 | 48 | 176 |
| 1 | 208 | 80 | 240 | 112 |
| 2 | 64 | 192 | 32 | 160 |
| 3 | 255 | 128 | 224 | 96 |

FIG. 7B

|   | 0 | 1 | 2 | 3 |
|---|---|---|---|---|
| 0 | 1 | 0 | 1 | 0 |
| 1 | 0 | 1 | 0 | 0 |
| 2 | 1 | 0 | 1 | 0 |
| 3 | 0 | 0 | 0 | 0 |

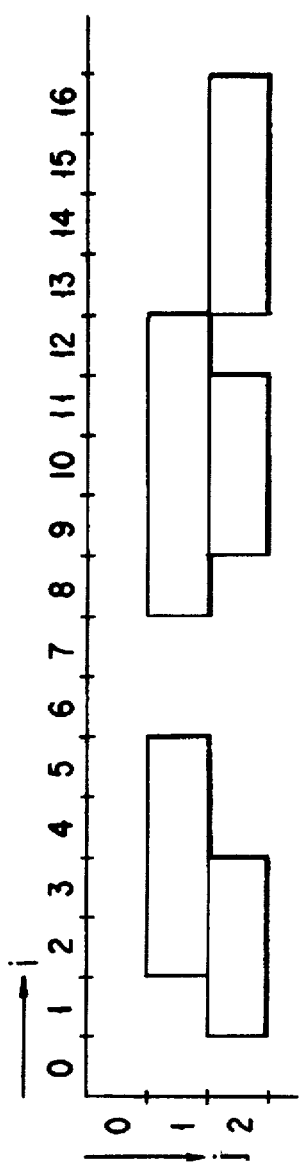
F I G. 10A
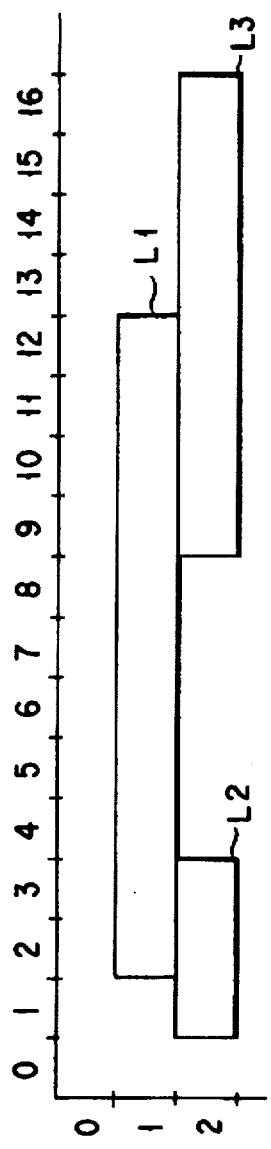
F I G. 10B
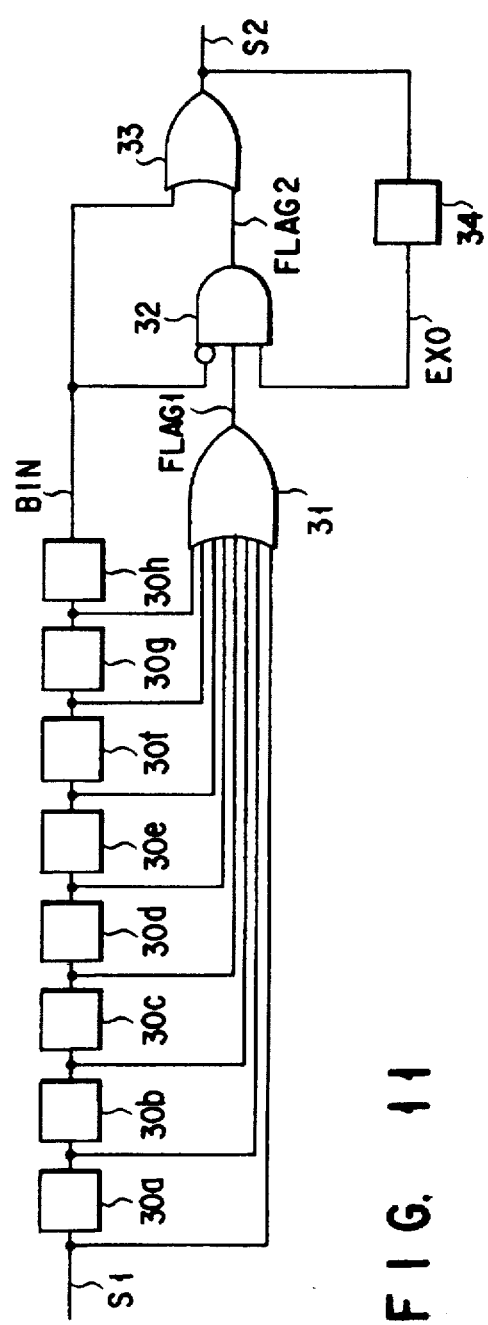
F I G. 11

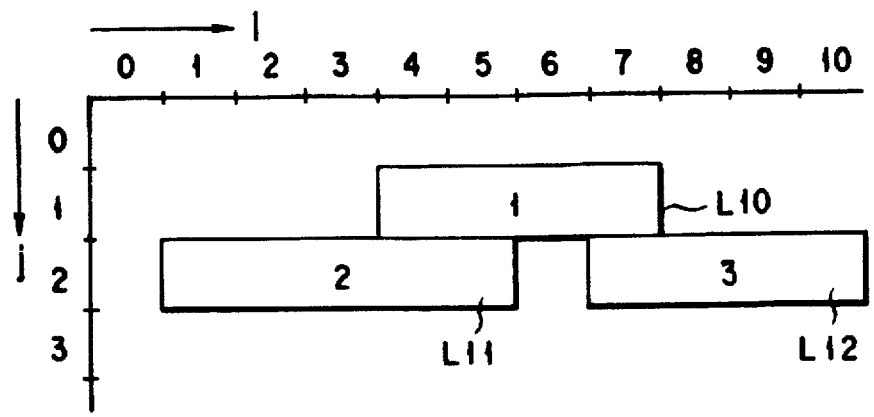
FIG. 12A
| RUN NUMBER | START POINT | | LENGTH |
|---|---|---|---|
| | i | j | l |
| 1 | 4 | 1 | 4 |
| 2 | 1 | 2 | 5 |
| 3 | 7 | 2 | 3 |
FIG. 12B
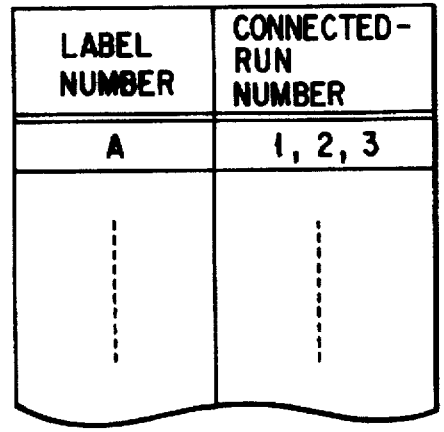
| LABEL NUMBER | CONNECTED-RUN NUMBER |
|---|---|
| A | 1, 2, 3 |
| ⋮ | ⋮ |
FIG. 13
| LABEL NUMBER | START POINT | | SIZE | |
|---|---|---|---|---|
| | $x_s$ | $y_s$ | $xl$ | $l$ |
| A | 1 | 1 | 9 | 2 |
| ⋮ | ⋮ | ⋮ | ⋮ | ⋮ |
FIG. 15

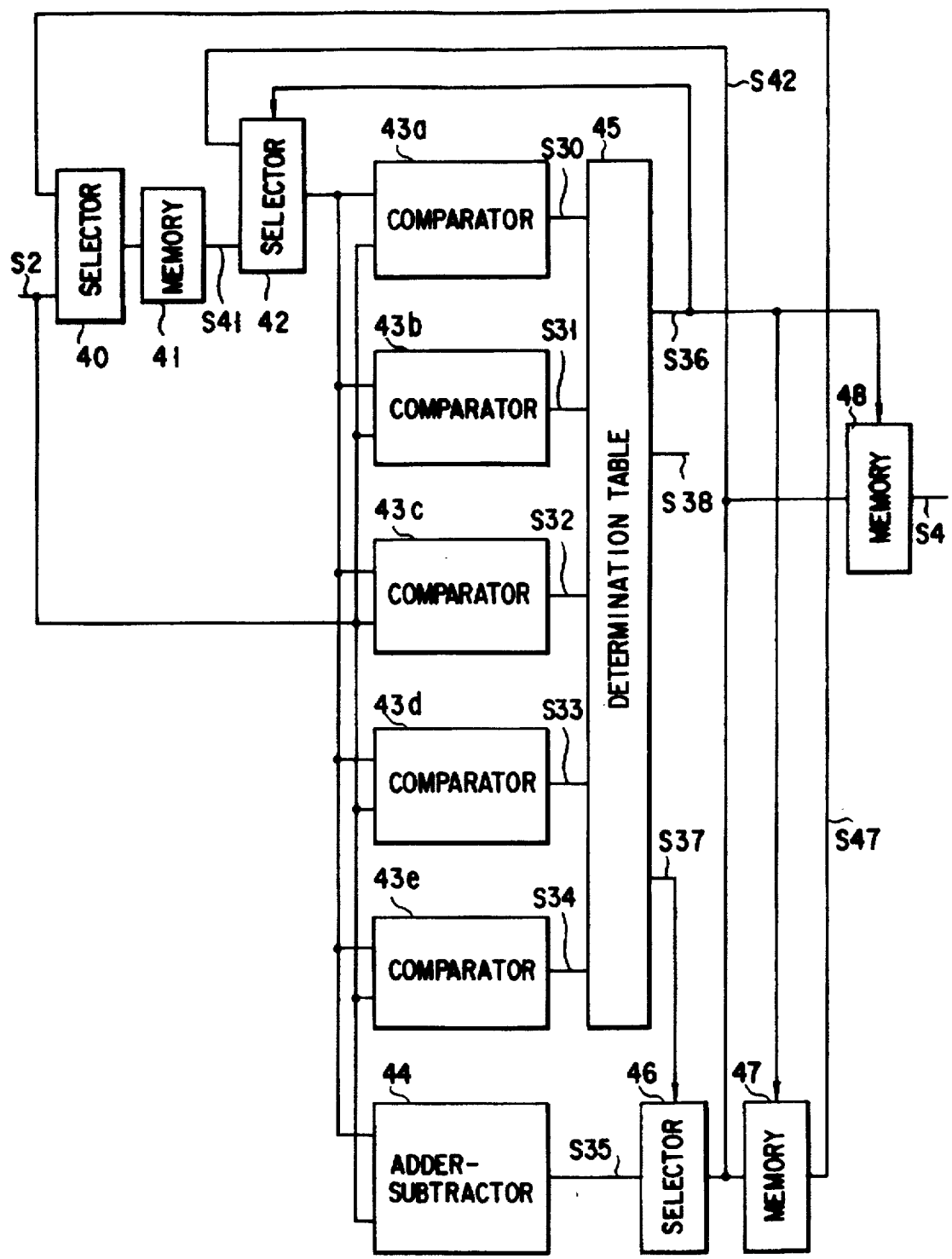
F I G. 17

IMAGE PROCESSING APPARATUS

BACKGROUND OF THE INVENTION

1. Field of the Invention

This invention relates to an image processing apparatus for subjecting, to image processing, a document image input, for example, to an OA system used in a general office (such as a facsimile, a scanner, a copy machine, etc.) thereby to create a duplicate image, and more particularly to an image processing apparatus for discriminating image regions with different features included in a document image, such as a text region, a photograph region, etc., and subjecting each image region to appropriate image processing so as to create a high-quality duplicate image.

2. Description of the Related Art

In general, in a document image processing apparatus capable of processing not only code data but also image data, an image with clear contrast, such as a text or a line, included in a document image picked by a scanner or similar pickup means is subjected to simple binarization using a fixed threshold value. On the other hand, an image with a gradation, such as a photograph, is subjected to binarization using pseudo gradation means such as an error diffusion method, etc.

If a picked image is simply binarized using the fixed threshold value, the quality of a text or line image region is not degraded since the resolution is kept high in the region, whereas the quality of a photograph region is degraded since the gradation is not preserved.

On the other hand, if the picked image is subjected to gradation processing using the error diffusion method, the quality of the photograph region is not degraded since the gradation is kept high in the region, whereas the quality of the text or line image region is degraded since the resolution is reduced.

In other words, in the case of subjecting a picked image to simple binarization, it is impossible to simultaneously keep high the quality of image components with different features. To binarize a document image including a text and a photograph such that the text has a high resolution and the photograph has a high gradation, it is necessary to divide the document image into a text region, a photograph region, a half tone region, etc., and then to binarize each region in an appropriate manner. Alternatively, it is necessary to subject each region to its optimal spatial filter processing to thereby binarize the region with particular pseudo gradation means. For example, it is necessary to binarize the text region using a high band-emphasizing filter, the photograph region (i.e. continuous region) using no filters, and the half-tone region using a low-pass filter.

Similarly, at the time of transmitting a manuscript read by a facsimile, etc., it is desirable to select a compression method which realizes a high compression ratio for each region. As a method for separating the text region, the continuous (photograph) region and the half-tone continuous (photograph) region from each other, "Block Separate Transformation (BSET) Method" is proposed in a paper entitled "Method for Discriminating and Processing a Half-Tone Photograph" published in the Institute of Electronics, Information and Communications Engineering 87 2 Vol. J70-B No. 2. In this method, an image to be processed is divided into several blocks, and the above-described three regions are separated depending upon the density variations therein. The following features in density variations can be used to determine the type of each block:

In the photograph region, the range of density variations is small.

In the text or half-tone region, the range of density variations is large.

In the text region, the cycle of density variation is long.

In the half-tone photograph region, the cycle of density variation is short.

The steps of image processing will now be explained.

(1) A to-be-processed image is divided into blocks each consisting of (m×n) pixels.

(2) A maximum density signal Dmax and a minimum density signal Dmin are detected in each block, and a maximum density difference signal ΔDmax is output.

(3) ΔDmax is compared with a predetermined threshold value Th1, thereby separating a continuous (photograph) region and a non-continuous region (i.e. text and half-tone regions) from each other as follows:

If $\Delta Dmax \leq Th1$, the block is considered to be a continuous region; and If $\Delta Dmax > Th1$, the block is considered to be a non-continuous region.

(4) Each pixel in the block is binarized into "0" or "1", using an average density signal Da indicative of the average density of all densities in the block.

(5) The number Kh of occasions where the pixel values of each adjacent pair of pixels arranged in the main scanning direction are different from each other (i.e. "0" and "1", or "1" and "0") is detected. Similarly, the number Kv of occasions where the pixel values of each adjacent pair of pixels arranged in the sub scanning direction are different from each other is detected.

(6) The values Kh and Kv are compared with a predetermined threshold value Th2, respectively, and the text region and the half-tone continuous region are separated from each other on the following conditions:

If $Kh \geq Th2$ and $Kv \geq Th2$, the block is considered Go be the half-tone continuous region; and If $Kh < Th2$ or $Kv < Th2$, the block is considered to be the text region.

Thus, text, photograph and half-tone continuous regions are separated from each other in an image to be processed, thereby enabling each region to be subjected to appropriate binarization.

However, if the regions are erroneously separated, i.e. if the regions are erroneously recognized, each block which consists of a pixel or pixels is inevitably subjected to inappropriate image processing, and accordingly such an image region in a manuscript as includes an unnecessary outline, an unevenness, etc. may well be picked and reproduced.

As another approach to solve the above problem, "Document Analysis System" (IBM J.RES. Develp. Vol. 26 No. 6 (1982)) discloses a method for processing a document image as a whole and extracting a text region therein. In this method, the distribution feature of characters (characters in the image are continuously arranged as a text string the main or sub scanning direction) is used. The steps of processing will be explained below.

(1) To binarize an image to be processed, to thereby form an image A.

(2) To expand a black-pixel portion of the image A in the main scanning direction, to thereby form an image B.

(3) To expand a black-pixel portion of the image A in the sub scanning direction, to form an image C.

(4) To calculate a logical sum of the images B and C, to form an image D.

(5) To calculate the size (length X×height H) of a rectangle which circumscribes the continuous black-pixel portion of the image D.

(6) To calculate the number DC of black pixels included in the image A within the rectangle.

(7) To calculate the number TC of occasions where each adjacent pair of pixels in the image A within the rectangle have different densities (i.e. the two pixels are white and black) in the main scanning direction.

(8) The average length R of black runs in the image A within the rectangle is given by $$R = DC/TC$$

(9) To calculate the respective average values Hm and Rm of the heights H and the average lengths R in all possible rectangles.

(10) To determine that the region which satisfies the following formulas is a text region:

$$R < C1 \times Rm$$
$$H < C2 \times Hm$$

where C1 and C2 represent constants.

The above procedure enables discrimination of the text region from the non-text region. In this method, regions are recognized not in units of a pixel, but in units of a rectangle such as a text string, thereby enabling uniform processing of each region.

FIG. 1 is a schematic view, showing the procedure of the above-described image region discrimination. An original image (image G1) to be processed is subjected to simple binarization, to thereby obtain a binary image (image G2). Subsequently, a black-pixel portion (see image G3) is obtained by expanding the black pixels of the binary image (image G2), and a rectangle which circumscribes the black-pixel portion is detected to extract an image region (see image G4).

The original image G1 consists of a text and a photograph wherein a person image is on a gray background region. If the image G1 is simply binarized, it is understood from the image G2 that the gray background region becomes white, and only the person image and the text portion become black. If the image G2 is subjected to expansion and rectangle-formation processes, the photograph region cannot accurately be extracted, as is evident from the images G3 and G4. In other words, the gray background region of the photograph, which has a gradation, will disappear as a result of the binarization, which means that the photograph region cannot accurately be extracted.

SUMMARY OF THE INVENTION

It is the object of the invention to provide an image processing apparatus capable of accurately extracting, from an image to be processed, image regions with different features, such as a text region, a photograph region, etc., thereby enabling easy recognition of the image regions and enhancing the accuracy of image processing.

In the invention, binarization means subjects a pixel signal indicative of an input image to one of the following binarization processes, thereby outputting a binary pixel signal indicative of a binary image:

(1) A binarization process which uses an error diffusion method for diffusing a binary error to peripheral pixels to thereby preserve a gradation;

(2) A binarization process wherein the binary error of a target pixel is compensated in a pixel to be processed after the target pixel, so as to preserve a gradation;

(3) A binarization process using a random threshold value;

(4) A binarization process using an organic dither method wherein the threshold value changes regularly; and (5) A binarization process using, as a threshold value, an average value within a window which consists of (n×n) pixels including a target pixel.

Run expansion means expands black pixels in a binary image on the basis of a binary pixel signal, thereby outputting a run expansion signal indicative of a black pixel portion (run). Labelling means and circumscribing-rectangle extraction means integrate connected runs into a single region (label) on the basis of the run expansion signal, obtains the position and the size of a rectangle which circumscribes the region, and outputs circumscribing-rectangle data indicative of them. Determination means determines, on the basis of the circumscribing-rectangle data, whether the region is a text region or a continuous region, and outputs a determination signal indicative of the determination result. As a result, image regions of different features, such as the text region, continuous region, etc., can be accurately extracted and easily discriminated.

In particular, the continuous (photograph) region can be discriminated with accuracy. Since even a gray region such as a dim background region in a photograph has its gradation preserved, the outline of the overall photograph image can be extracted accurately by expansion and rectangle extraction performed by the run expansion means, the labelling means and the circumscribing-rectangle extraction means.

In addition, since a photograph region can be accurately extracted and discriminated, an image processing apparatus such as a facsimile, a copy machine, etc. can enhance the efficiency of image transmission or the quality of a duplicate image by performing appropriate image processing in each image region.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 6 is a view, useful in explaining an example of a method employed in the third binarization process for generating a threshold value in a random manner;

FIGS. 7A–7C are views, useful in explaining the principle of an organizational dither method employed in a fourth binarization process;

FIG. 8 is a view, useful in explaining the concept of a window used in a fifth binarization process;

FIG. 9 is a view, showing an example of an average value calculation circuit for calculating an average density value in the window used as a threshold value in the fifth binarization process;

FIGS. 10A and 10B are views useful in explaining the principle of run expansion processing, wherein FIG. 10A shows examples of black pixels included in a binary image to be processed, and FIG. 10B shows examples of runs obtained by the run expansion processing;

FIG. 11 is a view, showing a circuit for executing the run expansion processing;

FIGS. 12A and 12B are views useful in explaining the run expansion processing, wherein FIG. 12A shows examples of runs extracted by run expansion means, and FIG. 12B shows an example of data concerning the run shown in FIG. 12A;

FIG. 13 is a view, showing an example of data concerning an integrated region as a result of labelling of the runs shown in FIG. 12;

FIGS. 14A–14C are views useful in explaining the principle of a method for extracting a circumscribing rectangle, wherein FIG. 14A shows an example of an integrated region from which the circumscribing rectangle is extracted, and FIGS. 14B and 14C are views for explaining a procedure for obtaining the circumscribing rectangle of the integrated region;

FIG. 15 is a view, showing an example of circumscribing rectangle data stored in circumscribing rectangle extraction means 4;

FIGS. 16A–16F are views useful in explaining determination conditions for determining the size of the circumscribing rectangle, wherein FIG. 16A shows the case of employing first determination conditions, FIG. 16B shows the case of employing second determination conditions, FIG. 16C shows the case of employing third determination conditions, FIG. 16D shows the case of employing fourth determination conditions, FIG. 16E shows the case of employing fifth determination conditions, and FIG. 16F shows the case of employing sixth determination conditions; and FIG. 17 shows an example of the circuit structures of labelling means and the circumscribing rectangle extraction means.

DETAILED DESCRIPTION OF THE PREFERRED EMBODIMENTS

The embodiment of the invention will be explained with reference to the accompanying drawings.

Figure 1:
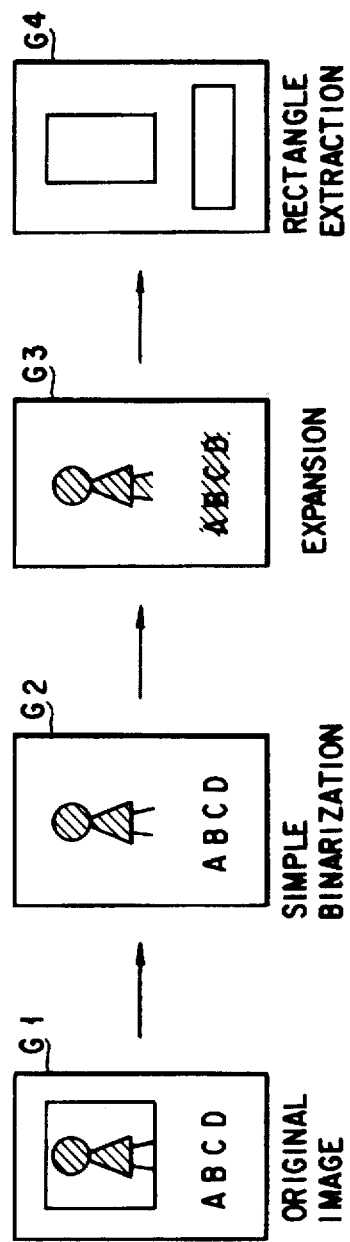
FIG. 1 is a view, useful in explaining a conventional method for discriminating image regions.
Figure 2:
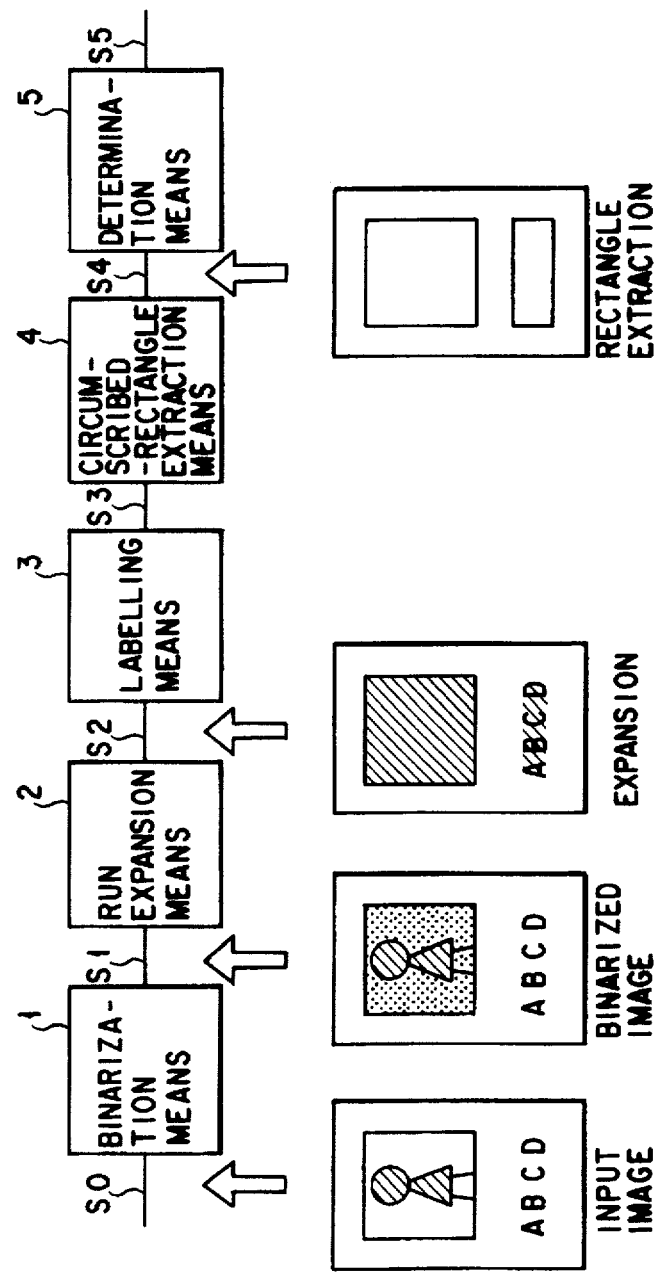
FIG. 2 is a schematic view, showing the overall structure of an image processing apparatus according to the embodiment of the invention.

FIG. 2 is a schematic view, showing the overall structure of an image processing apparatus according to the embodiment of the invention. In FIG. 2, a document image (input image) read by an image scanner, etc., including a text image, a photograph image, etc., and used in a general office is input, as a pixel signal S0 indicative of digital density data (pixel value) with 8 bits per one pixel, to binarization means 1 incorporated in the image processing apparatus. In the binarization means 1, the input image is converted to a binary image by binarization explained later, and a binary pixel signal S1 corresponding to the binary image is output.

The binary pixel signal S1 from the binarization means 1 is supplied to run expansion means 2, which in turn performs processing, explained later, for expanding black pixels included in the binary image on the basis of the binary pixel signal S1, thereby obtaining a black pixel portion (hereinafter called "run") and outputting a run expansion signal S2 indicative of the run.

The run expansion signal S2 from the run expansion means 2 is supplied to labelling means 3, which in turn integrates connected runs as a single region on the basis of the run expansion signal S2, and outputs a signal S3 indicative of the feature of the integrated region.

The signal S3 from the labelling means 3 is supplied to circumscribing-rectangle extraction means 4, which in turn calculates the size of a rectangle which circumscribes the integrated region, and outputs the calculation result as a signal S4.

The signal S4 from the circumscribing-rectangle extraction means 4 is supplied to determination means 5, which in turn determines, from the size of the circumscribing rectangle, the type of the image included in each rectangular region, for example, determines whether the image region is a text region or a photograph (continuous) region. The determination result is output as a signal S5.

The signal S5 from the determination means 5 is data concerning each image region whose image type has been determined. On the basis of the data, image processing is performed in the next processing section or the image processing apparatus, in accordance with the feature of the image region, thereby creating a high quality duplicate image.

The binarization means 2 shown in FIG. 2 will be explained. Binarization is a method for subjecting a target pixel to binarization using a threshold value determined independent of the target value or determined in accordance with the pixel values of peripheral pixels. This method includes the following five methods:

(1) First binarization using an error diffusion method for distributing a binarization error to the peripheral pixels thereby to preserve a gradation.

(2) Second binarization wherein the binarization error of the target pixel is compensated in the next pixel to be processed, thereby to preserve a gradation.

(3) Third binarization performed using a random threshold value.

(4) Fourth binarization using an organizational dither method for regularly changing the threshold value.

(5) Fifth binarization using, as a threshold value, an average value in a window of (n×n) pixels including the target pixel.

Figure 3:
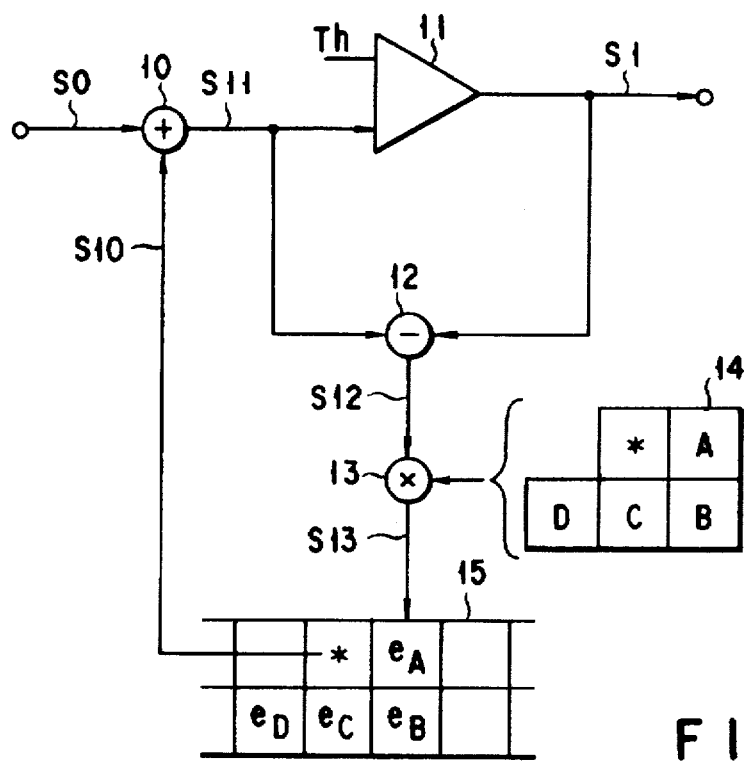
FIG. 3 is a view, useful in explaining an example of a first binarization process.

Referring first to FIG. 3, the first binarization will be explained. In the first binarization, a value obtained by multiplying the binarization error of a previously binarized peripheral pixel by a predetermined weighting factor is added to the pixel signal S0 as density data concerning the target pixel, then performing binarization using a fixed threshold value.

In FIG. 3, the pixel signal S0 read by an image input device such as a scanner is input to a correcting section 10, where correction processing is performed, i.e. where a correction signal S10 explained later is added to the signal S0, thereby outputting a correction signal S11.

The correction signal S11 is input to a comparing section 11, where it is compared with a fixed binarization threshold value Th (for example, "80h": h represents a hexadecimal number). If the correction signal S11 is higher than the threshold value Th, "1" (indicative of a black pixel) is output as the binary pixel signal S1, whereas if the correction signal S11 is lower than the threshold value Th, "0" (indicative of a white pixel) is output. The comparing section 11 performs comparison in accordance with the data length of the correction signal S11. Since in this case, the data length of the correction signal S11 is 8 bits, the section 11 compares the correction signal S11 with an 8-bit fixed threshold value Th, thereby outputting a 1-bit binary pixel signal S1.

A binarization error calculating section 12 calculates the difference (i.e. the binarization error) between the correction signal S11 and the binary pixel signal S1 (actually, a binary pixel signal value "0" indicates "00"h, and "1" indicates "ff"h), and outputs the calculation result as a binarization error signal S12.

A weighted-error calculating section 13 multiplies the binarization error signal S12 by weighting factors A, B, C and D (A=$7/16$; B=$1/16$; C=$5/16$; D=$3/16$) stored in a weighting factor storing section 14, thereby calculating weighted errors S13. In FIG. 3, "*" indicates the position of the target pixel. The weighted errors of peripheral four pixels (which correspond to the positions of the weighting factors A, B, C and D) of the target pixel are calculated by multiplying the binarization error of the target pixel by the weighting factors A, B, C and D, respectively.

An error storing section 15 stores the weighted errors S13 calculated by the weighted-error calculating section 13. Specifically, as is shown in FIG. 3, the section 15 stores the sum of the weighted errors for four pixels calculated by the calculating section 13, as correction amounts for four pixels located in positions eA, eB, eC and eD with respect to the target pixel "*".

The above-described correction signal S10 is dedicated to the pixel situated in the position "*" of the error storing section 15, and indicates the sum of the weighted errors for four pixels calculated in the above-described manner.

Figure 4:
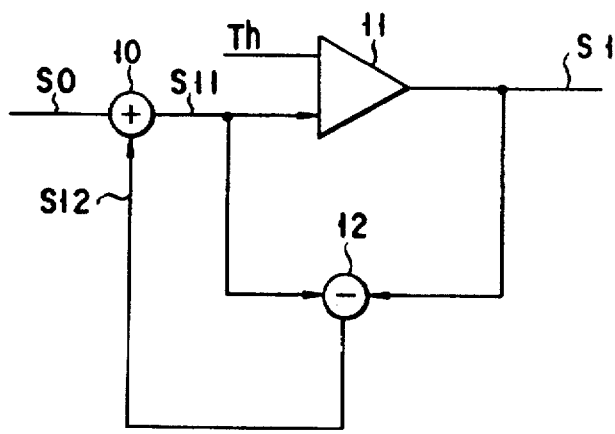
FIG. 4 is a view, useful in explaining an example of a second binarization process.

Referring then to FIG. 4, the second binarization will be explained. This processing is a modification of the first binarization (i.e. the "error diffusion method"). In this processing, the binarization error of a previously binarized pixel is added to the pixel value of a target pixel, thereby performing binarization using a fixed threshold value. In FIG. 4, elements similar to those in FIG. 3 are denoted by corresponding reference signs, and explanations will be given only of different elements.

In FIG. 4, the correcting section 10, the comparing section 11 and the binarization error calculating section 12 have structures identical to those in FIG. 3. The structure of FIG. 4 differs from that of FIG. 3 in the following point: In the FIG. 3 structure, the correction signal S10 is input to the correcting section 10 to correct the pixel signal S0. On the other hand, in the FIG. 4 structure, the binarization error signal S12 output from the binarization error calculating section 12 is directly input to the correcting section 10, and is added to the pixel signal S0 to correct the same.

As described above, since in the first binarization, the binarization error signal S12 is diffused to peripheral pixels which include the next line, an error calculating memory (the weighting factor storing section 14), a multiplier (the weighted-error calculating section 13) and a line memory (the error storing section 15) are required. On the other hand, since in the second binarization, each error (the binarization error signal S12) resulting from binarization is corrected in the processing of the next pixel, such a memory, a multiplier, etc. are not required.

Figure 5:
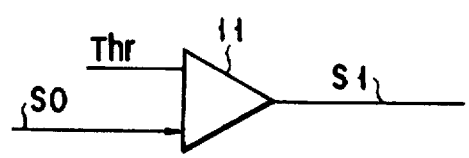
FIG. 5 is a view, useful in explaining an example of a third binarization process.

The third binarization will now be explained. In the second binarization, the comparing section 11 compares the fixed threshold value Th with the correction signal S11 to thereby output the binary pixel signal S1. On the other hand, in the third binarization, the pixel signal S0 is compared with a variable threshold value Thr to thereby output the binary pixel signal S1. Therefore, the third binarization can be performed only by the comparing section 11, as is shown in FIG. 5. More specifically, the variable threshold value Thr is input to one of the input terminals of the comparing section 11, and the pixel signal S0 is input to the other input terminal, thereby comparing them with each other. As a result, for example, a 1-bit binary pixel signal S1 as explained referring to FIG. 2 is output.

The third binarization is characterized by the threshold value Thr shown in FIG. 5 assumes a random value. The manner of generating the random value will be explained with reference to FIG. 6. FIG. 6 shows an example of a circuit for generating a random threshold value of 8 bits, which consists of 1-bit shift registers 22a–22h and an EXCLUSIVE-OR circuit 21.

A voluntary value (except for "0") is set in each of the shift registers 22a–22h. The voluntary values are output therefrom in synchronism with an image clock (not shown), and input to the next shift registers 22b–22h, respectively. At this time, the output of the EXCLUSIVE-OR circuit 21 is input to the shift register 22a, and the outputs of the shift registers 22b, 22c, 22g and 22h are input to the EXCLUSIVE-OR circuit 21.

The image clock is a timing signal, which is generated for each pixel in synchronism with the pixel signal S0, and input together with the pixel signal S0 to the image processing apparatus of the embodiment at the time of picking an input image by a scanner, etc.

Thus, each time the image clock is input to the shift registers 22a–22h, the outputs Thr0–Thr7 of the shift registers 22a–22h are input, as an 8-bit threshold value Thr, to the comparing section 11 shown in FIG. 5.

By virtue of the FIG. 6 structure, the outputs Thr0–Thr7 of the shift registers 22a–22h assume different values each time the image clock is input, thereby providing a random threshold value Thr.

The comparing section 11 shown in FIG. 5 compares the pixel signal S0 with the random threshold value Thr which assumes different values for different pixels. If the pixel value is lower than the threshold value Thr, a value of "0" is output as the binary pixel signal S1, whereas if the pixel value is higher than the threshold value Thr, a value of "1" is output as the signal S1.

The fourth binarization will be explained. This binarization employs an organizational dither method wherein the threshold value is regularly changed at the time of comparing the pixel signal S0 with the threshold value to perform binarization.

FIG. 7 is a view, useful in explaining the principle of the organizational dither method with the use of a dither matrix of (4×4). In this matrix, the threshold value changes in the cycle of 4 pixels in the main scan direction indicated by arrow i, and in the sub scan direction indicated by arrow j. Specifically, as is shown in FIGS. 7A and 7B, FIG. 7A shows a (4×4) matrix, which consists of four pixels extracted from an input image in each of the directions i and j. Each pixel value is "90". The pixel value is 8 bits, and ranges from "0" (indicative of a white pixel) to "255" (indicative of a black pixel).

FIG. 7C shows binary image data obtained by performing binarization of input image data in the form of the (4×4)

matrix by the organizational dither method using a dither matrix shown in FIG. 7B.

More specifically, suppose that the position of each pixel in the matrix is expressed by coordinates (i, j) in both the main and sub scan directions i and j. Then, the pixel value (indicated by the pixel signal S0) of a pixel with coordinates (i, j) in the input image matrix of FIG. 7A is compared with a threshold value with coordinates (i mod 4, j mod 4) in the FIG. 7B matrix. If the value of the pixel signal S0 is lower than the threshold value, "0" is output as the binary pixel signal S1, whereas if it is higher than the threshold value, "1" is output. "mod 4" in the coordinates (i mode 4, j mod 4) represents a remainder obtained when i or j is divided by 4.

For example, as regards a pixel with coordinates (0, 0) in the input image matrix of FIG. 7A, the pixel value of the pixel is "90", and the threshold value with coordinates (0, 0) in the FIG. 7B matrix is "16". Therefore, "1" is output as a result of comparison. In other words, a pixel with coordinates (0, 0) in the binary image matrix of FIG. 7C is considered "black pixel".

Similarly, as regards a pixel with coordinates (1, 0) in the input image matrix of FIG. 7A, the pixel value of the pixel is "90", and a threshold value with coordinates (1, 0) in the FIG. 7B matrix is "144". Therefore, "0" is output as a result of comparison. In other words, a pixel with coordinates (1, 0) in the binary image matrix of FIG. 7C is considered "white pixel". Repeating the same processing as above will provide the binary image matrix shown in FIG. 7C.

Moreover, the comparing section shown in FIG. 5 may be used to compare the pixel value (indicated by the pixel signal S0) of a pixel with coordinates (i, j) of the input image with a corresponding threshold value in the dither matrix. Although the FIG. 7 case employs the (4×4) dither matrix, the dither matrix may have any voluntary size of (n×n).

The fifth binarization will be explained. In this binarization, each pixel area of (n×n) pixels included in an input image is used as a window, and the average of the pixel values in the window is used as a threshold value to perform binarization.

FIG. 8 shows the positional relationship between a target pixel P and a window W consisting of a plurality of pixels and used to calculate that average of pixel values of the pixels, which is used as a threshold value for subjecting the pixel value (indicated by the pixel signal S0) of the target pixel P to binarization. In the FIG. 8 case, the window W consists of (4×4) pixels. The size of the window is not limited to this The window may consist of (n×n) pixels (n=any voluntary integer higher than 1).

In the FIG. 8 case, the target pixel P is situated in a position with coordinates (1, 1) when the position of each pixel in the window W is expressed by coordinates (i, j) in directions indicated by arrows i and j. Such windows are set all over the input image, using each of all pixels constituting the input image as the target pixel P. Concerning all the target pixels P, the pixel signal S0 is subjected to binarization to thereby obtain the binary pixel signal S1. The positional relationship between the target pixel P and the window W is not limited to that shown in FIG. 8.

Supposing that the pixel value, i.e. the density, of a pixel with coordinates (i, j) in the window W is represented by Dij, the average density Da used as a threshold value is given by $$Da = \frac{\sum_{i,j} D_{i,j}}{n \times n} \quad (1)$$

An average value calculating circuit (smoothing circuit) as shown in FIG. 9 can be used to calculate the average density Da.

In the smoothing circuit shown in FIG. 9, four 8-bit pixel signals S0 indicative of continuous four pixels included in the input image and arranged in the line direction (i.e. the main scan direction) are respectively input, in synchronism with the image clock CLK, to four data input ports each constituted by an 8-bit input terminal.

The four pixel signals S0 indicative of the four pixels and supplied to the smoothing circuit are sequentially input to those four input ports of a selector 25 which are each constituted by an 8-bit data input terminal. A counter 26 counts the image clock CLK pulses to thereby output a selection signal of 2 bits, each time the pixel signals S0 corresponding to four pixels are input to the selector 25.

The selector 25 is responsive to the selection signal from the counter 26 for outputting the pixel signals S0 corresponding to four pixels arranged in each line, to a corresponding one of its four output ports A–D each constituted by an 8-bit data output terminal. In other words, continuous four pixels (with coordinates (i, 0)) arranged in a first line in the window W of FIG. 8, continuous four pixels (with coordinates (i, 1)) arranged in a second line, continuous four pixels (with coordinates (i, 2)) arranged in a third line, and continuous four pixels (with coordinates (i, 3)) arranged in a fourth line are output from the four output ports A–D, respectively.

The output ports A–D of the selector 25 are connected to adders 27a–27d, respectively, and the pixel signals S0 corresponding to the four pixels in each line are distributed to a corresponding one of the adders. Each of the adders 27a–27d calculates the sum of the pixel values of the continuous pixels arranged in a corresponding line.

The addition results of the adders 27a–27d are input to an adder 28, which in turn calculates the sum of the input addition results concerning all the four lines, i.e. calculates the sum of the pixel values (density values) of all pixels included in the FIG. 8 window consisting of (4×4) pixels.

The addition result of the adder 28, i.e. the sum of the pixel values (density values) of all pixels in the window, is input to a divider 29, where the sum is divided by the number of the pixels in the window, i.e. 16 (4×4), thereby outputting the average of the pixels values (the values of the pixel signals S0) in the window of (4×4) pixels as shown in FIG. 8. The pixel value (the value of the pixel signal S0) of a target pixel as shown in FIG. 8 is compared with the average used as a threshold value. If the pixel value is lower than the threshold value, "0" is output as the binary pixel signal S1, whereas if the pixel value is higher than the threshold value, "1" is output. This binarization is performed for all the pixels of the input image, to thereby provide a binary image.

The comparing section 11 shown in FIG. 5 may be used to compare the threshold value with the pixel value of the target pixel P.

The binary pixel signal S1, which is output by the binarization means 1 of FIG. 2 using one of the first through fifth binarization methods when the pixel signal S0 has been input thereto, is input to the run expansion means 2. The run expansion means 2 in turn performs expansion processing of black pixels arranged in the main scan direction, on the basis of the binary pixel signal S1.

The run expansion is a process wherein if there is a black pixel in the main scan direction within a predetermined range of the number of pixels from a target pixel (a black pixel), all white pixels interposed between the black pixel and the target pixel are replaced with black pixels.

The run expansion will be explained in detail with reference to FIG. 10. For facilitating the explanation, the range of the number of pixels is set to "4". In FIG. 10, the position of each pixel of a binary image is expressed by coordinates (i, j) in the X and Y directions.

Suppose a case as shown in FIG. 10A, where black pixels continue from a position with coordinates (2, 1) to a position with coordinates (5, 1) in the main scan direction, and further black pixels continue from a position with coordinates (8, 1) to a position with coordinates (12, 1) in the main scan direction, with two white pixels interposed therebetween. In this case, the interposed white pixels are replaced with black pixels, and accordingly a run (black pixel portion) L1 as shown in FIG. 10B is obtained in which black pixels continue from the position with coordinates (2, 1) to the position with coordinates (12, 1).

As regards pixels with coordinates (1, 2) in FIG. 10A, black pixels continue from a position with coordinates (1, 2) to a position with coordinates (3, 2) in the main scan direction. However, no black pixels exist within a range of 4 pixels from a position with coordinates (4, 2). Therefore, no change is made to pixels from the position with coordinates (4, 2) to a position with coordinates (8, 2), thereby providing a run L2 as shown in FIG. 10B.

Similarly, a white pixel existing between a black pixel with coordinates (11, 2) and a black pixel with coordinates (13, 2) is replaced with a black pixel, thereby obtaining a run L3 which continue from a black pixel with coordinates (9, 2) to a black pixel with coordinates (16, 2), as shown in FIG. 10B. As described above, where there is a black pixel within a range of four pixels in the main scan direction, any white pixel between black pixels is replaced with a black pixel.

FIG. 11 shows an example of a circuit for performing the run expansion. In the FIG. 11 case, the binary pixel signal S1 is input to a latch circuit 30a. The latch circuit 30a and latch circuits 30b–30h are connected in series such that the output of each of the latch circuits is input to the next one connected thereto. In other words, a binary pixel signal S1 (a binary pixel value) corresponding to a first pixel is input to the latch circuit 30a together with an image clock pulse in synchronism with the first pixel. Then, the signal S1 is latched (temporarily held) by the latch circuit (which consists of a flip-flop circuit) 30a in synchronism with the image clock pulse, and output to the next latch circuit 30b. The next latch circuit 30b latches the binary pixel value corresponding to the first pixel in synchronism with the image clock pulse corresponding to a second pixel. At this time, the latch circuit 30a latches a binary pixel value corresponding to the second pixel. Thus, the binary pixel value latched by each of the latch circuits is output to and latched by the next latch circuit.

The outputs of the latch circuits 30a–30g are input to an OR circuit 31. The binary pixel signal S1 to be input to the first latch circuit 30a is also input to the OR circuit 31. The OR circuit 31 calculates the logical sum of them, and outputs it as a signal FLAG1 to an AND circuit 32. The binary pixel value output from the last latch circuit 30h is input to an OR circuit 33 and also to the inverted terminal of the AND circuit 32.

Supposing that the binary pixel value BIN latched by the latch circuit 30h is a target pixel, binary pixel values latched by the latch circuits 30b–30g and a binary pixel value to be input to the latch circuit 30a respectively correspond to first through eighth pixels output after the target pixel. The OR circuit 31 outputs "1" as the signal FLAG1 if the first through eighth pixels include at least one black pixel, and outputs "0" as the signal FLAG1 if they include no black pixels. In other words, it can be determined from the signal FLAG1 whether or not at least one black pixel is included in 8 pixels output after the target pixel.

The binary pixel value BIN, the signal FLAG1, and a run expansion signal EXO (explained later) corresponding to a pixel scanned immediately before the target pixel are input to the AND circuit 32. If the target pixel latched by the latch circuit 30h is a white pixel, the AND circuit 32 determines whether or not black pixels between which the white pixel is situated are included in continuous 8 pixels, and outputs a signal FLAG2 indicative of the determination result. The value of the signal FLAG2 is determined as follows:

If the signal BIN is set at "0", the signal FLAG1 at "1", and the signal EXO at "1", the signal FLAG2 is set to "1";

If any of these conditions is not satisfied, the signal FLAG2 is set to "0".

The OR circuit 33 receives the binary pixel value BIN of the target pixel and the output signal FLAG2 of the AND circuit 32, and outputs a run expansion signal S2. The value of the signal S2 is determined as follows:

If the signal BIN is set at "1", or the signal FLAG2 at "1", the run expansion signal S2 is set to "1";

If the signal BIN is set at "0", and the signal FLAG2 at "0", the run expansion signal S2 is set to "0".

The above-described run expansion signal EXO corresponding to a pixel scanned immediately before the target pixel is obtained by delaying the run expansion signal S2 output from the OR circuit 33, by one pixel by means of a latch circuit 34 in synchronism with the image clock. On the basis of the run expansion signal S2 output as data concerning each run (each black pixel portion) extracted from a binary image, the coordinates of the start position of the run, those of the end position of the run, and the length of the run are obtained.

The labelling means 3 shown in FIG. 2 will now be explained. The labelling means 3 performs labelling processing, wherein connected runs are integrated as one region, on the basis of the run expansion signals S2 output by the run expansion means 2.

FIG. 12A shows examples of runs extracted by the run expansion means 2, and FIG. 12B a table which stores examples of run data obtained from the run expansion signals S2 corresponding to the runs shown in FIG. 12A.

The table of FIG. 12B stores a run number assigned to each run, the coordinates of the start position of the run, those of the end position of the run, and the length of the run. The labelling means 3 performs labelling on the basis of the run data. The run data may be stored in a predetermined memory area in the image processing apparatus of the invention.

In FIG. 12A, a run L10 with a run number of "1" is connected to a run L11 with a run number of "2", and further to a run L12 with a run number of "3". In other words, the runs L10–L12 are all connected. The labelling means 3 integrates these runs as one region.

FIG. 13 shows data concerning integrated regions resulting from integrating the runs shown in FIG. 12A. A label "A" is assigned to an integrated region including connected runs with run numbers "1", "2" and "3", and the run numbers are stored as data indicating the feature of the region. The data shown in FIG. 13 is output as a signal S3 to the circumscribing-rectangle extraction means 4.

Figure 14A:
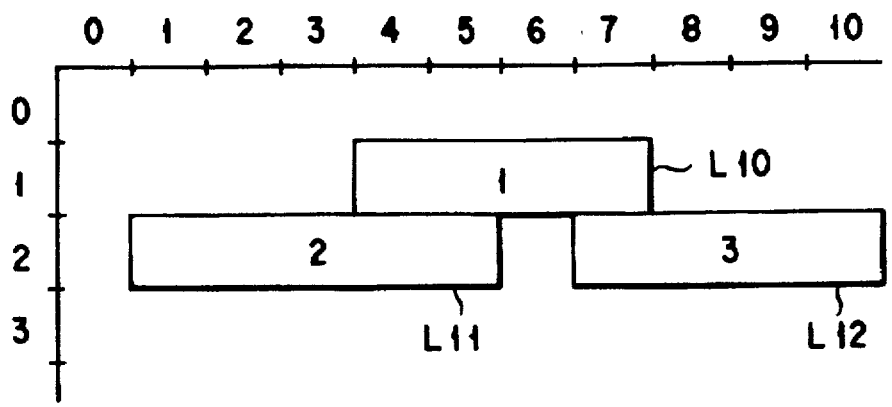
Figure 14B:
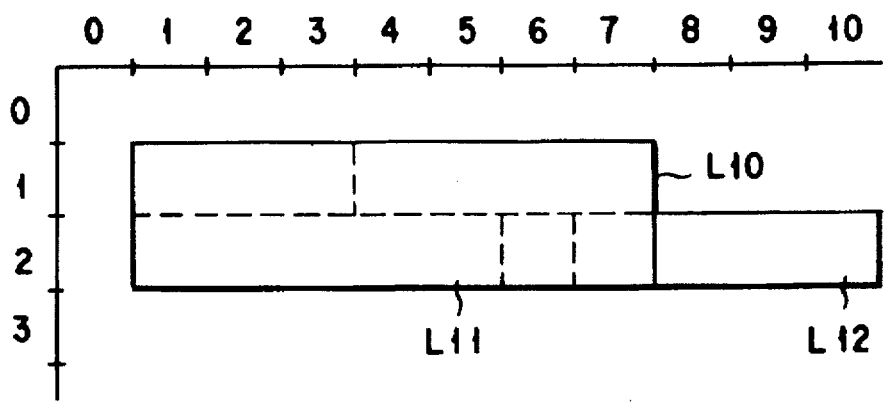
Figure 14C:
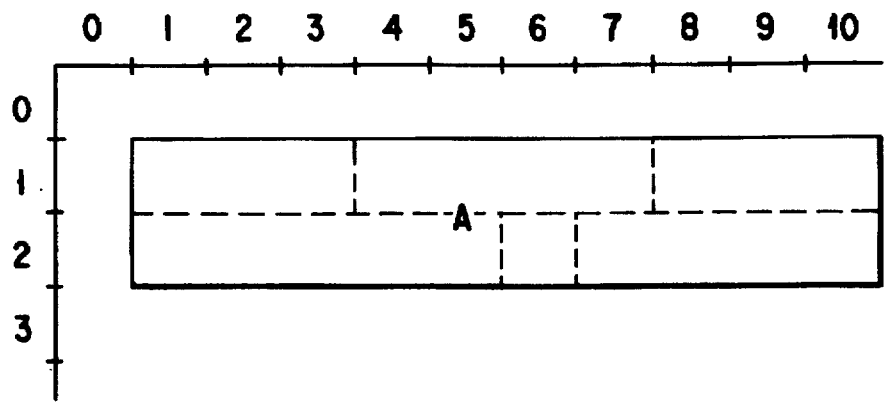

The circumscribing-rectangle extraction means 4 will be explained. This means determines the position and size of a rectangle which circumscribes each region integrated by the labelling means 3. Referring to FIGS. 14A–14C, the principle of extraction of a circumscribing rectangle will be explained first.

FIG. 14A shows an example of a region from which a circumscribing rectangle is extracted, and which is the same region as that shown in FIG. 12 and has the label "A" assigned. That is, the region shown in FIG. 14A includes connected runs with the run numbers "1", "2" and "3". To determine the size of this region, comparison is made concerning the start points, the end points, the lengths, etc. of the runs extending from left to right on a target line and a line previous to the target line.

More specifically, take attention first to the run L11 on the target line and the run L10 on the previous line in FIG. 14A. Since the X-coordinate of the start point of the run L11 is lower than that of the start point of the run L10, the start point of the run L11 serves as the start point of a circumscribing rectangle which circumscribes the runs L10 and L11. On the other hand, since the X-coordinate of the end point of the run L10 is higher than that of the end point of the run L11, the end point of the run L11 serves as the end point of the circumscribing rectangle which circumscribes the runs L10 and L11. Thus, the circumscribing rectangle which circumscribes the runs L10 and L11 is indicated by the solid line shown in FIG. 14B.

Then, take attention to the runs L12 and L10 in FIG. 14A. Since the X-coordinate of the start point of the run L10 is lower than that of the start point of the run L12, the start point of the run L10 serves as the start point of a circumscribing rectangle which circumscribes the runs L10 and L12. On the other hand, since the X-coordinate of the end point of the run L12 is higher than that of the end point of the run L10, the end point of the run L12 serves as the end point of the circumscribing rectangle which circumscribes the runs L10 and L12. Further, in light of the circumscribing rectangle indicated by the solid line in FIG. 14B, a circumscribing rectangle which circumscribes the runs L10, L11 and L12 is indicated by the solid line shown in FIG. 14C.

As regards the region with the label "A" wherein the runs L10–L12 shown in FIG. 14A are integrated, the circumscribing-rectangle extraction means 4 uses the lowest X-coordinate and the lowest Y-coordinate of the coordinates (x1, y1), (x2, y2) and (x3, y3) of the start points of the runs L10–L12, as the coordinates (xs, ys) of the start point of the circumscribing rectangle. In other words, where the coordinates of the start points of a number n of runs included in a region with a certain label are (x1, y1), (x2, y2), point of the circumscribing rectangle of the runs are given by xs=min (x1, x2, . . . , xn)

ys=min (y1, y2, . . . , yn)

Similarly, the coordinates (xe, ye) of the end point of the circumscribing rectangle are given by xe=max (x1, x2, . . . , xn)

ye=max (y1, y2, . . . , yn)

Moreover, the size of the circumscribing rectangle, i.e. the x-directional and y-directional lengths (x1, y1), is given by x1=xe−xs+1 y1=ye−ys+1

Circumscribing-rectangle data S4 calculated in the above-described manner on the basis of the run data shown in FIG. 12B are stored as shown in FIG. 15. The FIG. 15 table stores the coordinates of the start point and the size (x1, y1) of the circumscribing rectangle with the label "A".

The specific conditions for determining the size of the circumscribing rectangle will be explained with reference to FIG. 16. In FIG. 16, run data items X0, Y0, and M0 indicate the x-coordinate X0 and the y-coordinate Y0 of the start point of a run L20 on a first line, and the run length M0 of the run, respectively. Run data items X1, Y1, and M1 indicate the x-coordinate X1 and the y-coordinate Y1 of the start point of a run L21 on a second line, and the run length M1 of the run, respectively. Moreover, the start point of a circumscribing rectangle obtained by the determination is indicated by the x-coordinate and the y-coordinate, and the size of the rectangle by the x-directional length and the y-directional length.

To determine the size of the circumscribing rectangle, the relationship in position between the run L20 on the first line and the run L21 on the second line must be determined. Specifically, six cases as shown in FIGS. 16A–16F must be considered.

Figure 16A:
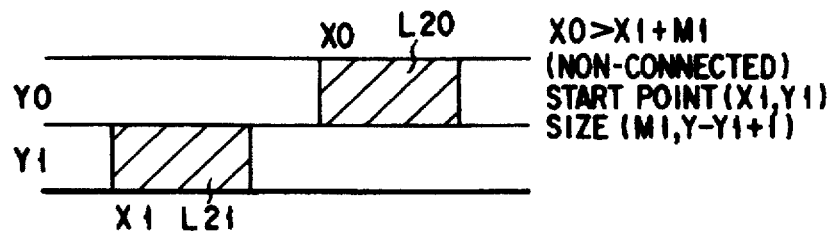

FIG. 16A is a view, useful in explaining first determination conditions, wherein the x-coordinates of the start and end points of the run L21 on the second line are lower than those of the run L20 on the first line, and the runs L20 and L21 are not connected to each other. In other words, if X0>X1+M1, it is determined that the runs L20 and L21 are not connected to each other. As a result, the start point of the obtained circumscribing rectangle is determined to be (X1, Y1), and the size of the same (M1, Y−Y1+1). Y represents the number of a line being processed, and Y=Y1 in the FIG. 16A case.

Figure 16B:
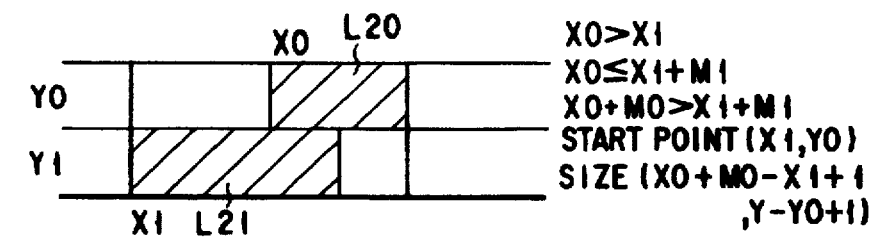

FIG. 16B is a view, useful in explaining second determination conditions, wherein the x-coordinates of the start and end points of the run L21 on the second line are lower than those of the run L20 on the first line, and the runs L20 and L21 are connected to each other. In other words, if X0>X1, X0 . . . X1+M1, and X0+M0>X1+M1, the start point of the obtained circumscribing rectangle is (X1, Y0), and the size of the same is (X0+M0−X1+1, Y−Y0+1).

Figure 16C:
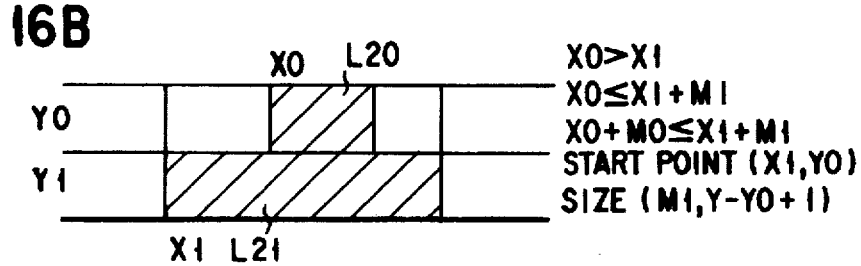

FIG. 16C is a view, useful in explaining third determination conditions, wherein the x-coordinate of the start point of the run L21 on the second line is lower than that of the run L20 on the first line, the x-coordinate of the end point of the run L21 is higher than that of the run L20, and the runs L20 and L21 are connected to each other. In other words, if X0>X1, X0≦X1+M1, and X0+M0≦X1+M1, the start point of the obtained circumscribing rectangle is (X1, Y0), and the size of the same is (M1, Y−Y0+1).

Figure 16D:
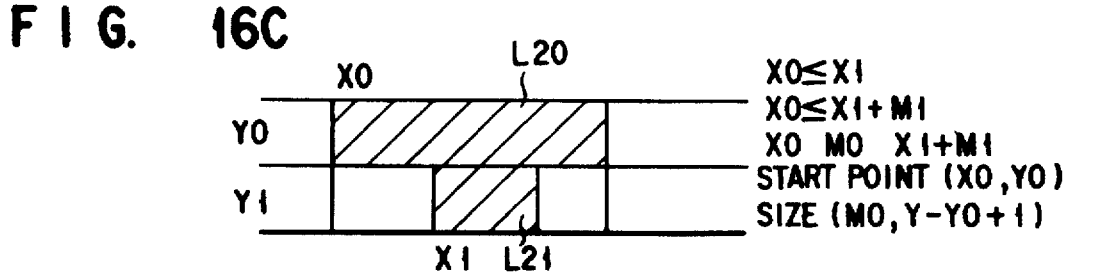

FIG. 16D is a view, useful in explaining fourth determination conditions, wherein the x-coordinate of the start point of the run L21 on the second line is higher than that of the run L20 on the first line, the x-coordinate of the end point of the run L21 is lower than that of the run L20, and the runs L20 and L21 are connected to each other. In other words, if X0≦X1, X0 . . . X1+M1, and X0+M0>X1+M1, the start point of the obtained circumscribing rectangle is (X0, Y0), and the size of the same is (M0, Y−Y0+1).

Figure 16E:
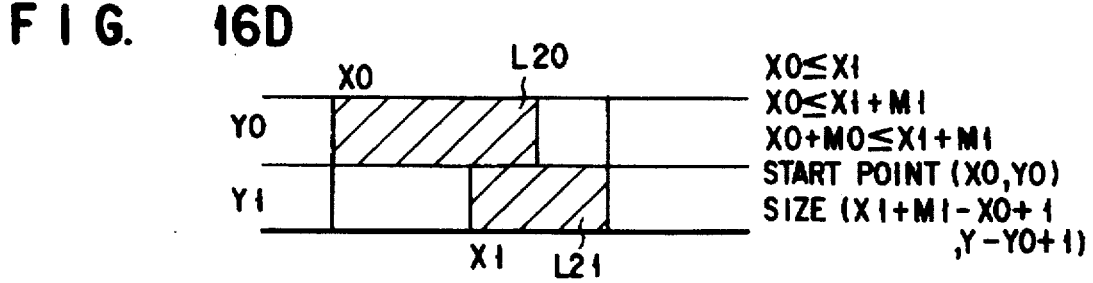

FIG. 16E is a view, useful in explaining fifth determination conditions, wherein the x-coordinate of the start point of the run L21 on the second line is higher than that of the run L20 on the first line, the x-coordinate of the end point of the run L21 is higher than that of the run L20, and the runs L20 and L21 are connected to each other. In other words, if X0≦X1, X0≦X1+M1, and X0+M0≦X1+M1, the start point of the obtained circumscribing rectangle is (X0, Y0), and the size of the same is (X1+M1−X0, Y−Y0+1).

Figure 16F:
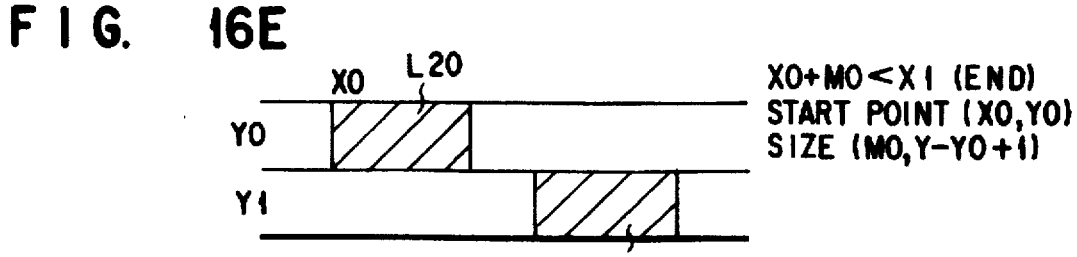

FIG. 16F is a view, useful in explaining sixth determination conditions, wherein the x-coordinates of the start and end points of the run L21 on the second line are higher than those of the run L20 on the first line, and the runs L20 and L21 are not connected to each other. In other words, if X0+M0<X1, it is determined that the connection state of the run L20 on the first line and L21 is terminated. As a result, the start point of the obtained Circumscribing rectangle is (X0, Y0), and the size of the same (M0, Y−Y0+1).

FIG. 17 shows examples of the labelling means 3 and the circumscribing-rectangle extraction means 4. As is shown in FIG. 17, concerning the run expansion signal S2 from the run expansion means 2, run data (the X and Y coordinates of the start point of a run on a first line, and the run length of the run) are stored in a memory 41 via a selector 40. The run data stored in the memory 41 are supplied to comparators 43a–43e via a selector 42, where the run data concerning the runs on the first and second lines are compared with each other. Further, the run data stored in the memory 41 is supplied also to an adder-subtracter 44 via the selector 42, where the run data are subjected to addition and subtraction if the runs on the first and second lines are connected to each other, thereby calculating the coordinates of the start point of the integrated region including connected runs, the size of the region, etc.

The comparator 43a compares the x-coordinate X0 of the start point of a first run on the first line with the x-coordinate X1 of that of a first run on the second line.

At this time, if X0>X1, the comparator 43a outputs "1" as a comparison signal S30, whereas if X0≦X1, it outputs "0" as the signal S30.

The comparator 43b compares the x-coordinate X0 of the start point of the first run on the first line with the x-coordinate (X1+M1) of the end point of the first run on the second line.

At this time, if X0>X1+M1, the comparator 43b outputs "1" as a comparison signal S31, whereas if X0≦X1+M1, it outputs "0" as the signal S31.

The comparator 43c compares the x-coordinate (X0+M0) of the end point of the first run on the first line with the x-coordinate (X1+M1) of the end point of the first run on the second line.

At this time, if X0+M0>X1+M1, the comparator 43c outputs "1" as a comparison signal S32, whereas if X0+M0≦X1+M1, it outputs "0" as the signal S32.

The comparator 43d compares the x-coordinate (X0+M0) of the end point of the first run on the first line with the x-coordinate X1 of the start point of the first run on the second line.

At this time, if X0+M0>X1, the comparator 43d outputs "1" as a comparison signal S33, whereas if X0+M0≦X1, it outputs "0" as the signal S33.

The comparator 43e compares the y-coordinate Y0 of the start point of the first run on the first line with the y-coordinate Y1 of that of the first run on the second line.

At this time, if Y0>Y1, the comparator 43e outputs "1" as a comparison signal S34, whereas if Y0≦Y1, it outputs "0" as the signal S34.

When the runs are connected to each other, the adder-subtracter 44 calculates the following to obtain the size (length) of an integrated region of the runs:

X0+M0−X1+1 or

X1+M1−X0+1

The adder-subtracter 44 supplies a selector 46 with X0, Y0, X1, Y1, M0, M1, X0+M0−X1+1, and X1+M1−X0+1 as signals S35 including calculation results, etc.

On the basis of the signals S30, S31, S33 and S34, a determination table 45 determines the positional relationship between the runs on the first and second lines as described above. Specifically, depending upon the above-described first through sixth determination conditions, the determination table 45 outputs selection signals S36 and S37 to the selectors 42 and 46 and memories 47 and 48, and a run selection signal S38. The run selection signal S38 is used to shift the run to be processed from one to another, and stored in a memory (which is not shown but also stores the run expansion signal S2).

The selection signal S37 is of 4 bits, lower three ones of which are determined depending upon the first through sixth determination conditions, and the highest one of which consists of the comparison signal S34. Where the determination table 45 determines that the first determination conditions are satisfied, i.e. where the comparison signal S31 is "1", the run on the second line is not connected to the run on the first line as shown in FIG. 16A. In this case, the determination table 45 outputs "0" as the selection signal S36, "000" as the lower three bits of the selection signal S37, and "1" as the run selection signal S38.

Where the determination table 45 determines that the second determination conditions are satisfied, i.e. where the comparison signals S30, S31 and S32 are "1", "0" and "1", respectively, the run on the second line is connected to the run on the first line as shown in FIG. 16B. In this case, the determination table 45 outputs "0" as the selection signal S36, "001" as the lower three bits of the selection signal S37, and "1" as the run selection signal S38.

Where the determination table 45 determines that the third determination conditions are satisfied, i.e. where the comparison signals S30, S31 and S32 are "1", "0" and "0", respectively, the run on the second line is connected to the run on the first line as shown in FIG. 16C. In this case, the determination table 45 outputs "0" as the selection signal S36, "010" as the lower three bits of the selection signal S37, and "0" as the run selection signal S38.

Where the determination table 45 determines that the fourth determination conditions are satisfied, i.e. where the comparison signals S30, S31 and S32 are "0", "0" and "1", respectively, the run on the second line is connected to the run on the first line as shown in FIG. 16D. In this case, the determination table 45 outputs "0" as the selection signal S36, "011" as the lower three bits of the selection signal S37, and "1" as the run selection signal S38.

Where the determination table 45 determines that the fifth determination conditions are satisfied, i.e. where the comparison signals S30, S31 and S32 are "0", "0" and "0", respectively, the run on the second line is connected to the run on the first line as shown in FIG. 16E. In this case, the determination table 45 outputs "0" as the selection signal S36, "100" as the lower three bits of the selection signal S37, and "0" as the run selection signal S38.

Where the determination table 45 determines that the sixth determination conditions are satisfied, i.e. where the comparison signal S33 is "0", connection of the runs on the first and second lines is completed as shown in FIG. 16F. In this case, the determination table 45 outputs "1" as the selection signal S36, "101" as the lower three bits of the selection signal S37, and "0" as the run selection signal S38.

The output of the adder-subtracter 44 is input to the selector 46, which in turn outputs label data corresponding to the lower three bits of the selection signal S37. The word "label" means a region formed by integrating the runs on the first and second lines, and the "label data" indicate the start point of the label, the size thereof, etc.

When the lower three bits of the selection signal S37 are "000", the selector 46 outputs (X1, Y1) as the start point coordinates of the label, and (M1, Y−Y1+1) as the size of the label (see FIG. 16A).

When the lower three bits of the selection signal S37 are "001", the selector 46 outputs (X1, Yp) as the start point coordinates of the label, and (M1, Y−Yp+1) as the size of the label (see FIG. 16B) (Yp indicates the lower one of y-coordinates Y0 and Y1 which is determined by the comparator 43).

When the lower three bits of the selection signal S37 are "010", the selector 46 outputs (X1, Yp) as the start point coordinates of the label, and (M1, Y−Yp+1) as the size of the label (see FIG. 16C).

When the lower three bits of the selection signal S37 are "011", the selector 46 outputs (X0, Yp) as the start point coordinates of the label, and (M0, Y−Yp+1) as the size of the label (see FIG. 16D).

When the lower three bits of the selection signal S37 are "100", the selector 46 outputs (X0, Yp) as the start point coordinates of the label, and (X1+M1−X0+1, Y−Yp+1) as the size of the label (see FIG. 16E).

When the lower three bits of the selection signal S37 are "101", the selector 46 outputs (X0, Y0) as the start point coordinates of the label, and (M0, Y−Y0+1) as the size of the label (see FIG. 16F).

The selection signal S36 selects one of a memory 47 for internal calculation and a buffer memory 48 for outputting a result of labelling processing, to store therein the label data output from the selector 46. Specifically, only when the sixth determination conditions are satisfied in the determination table 45 and the run connection is completed (the FIG. 16F case), "1" is output as the selection signal S36. At this time, label data output as a signal S42 from the selector 46 is stored in the memory 47.

The memory 47 stores the label data output as the signal S42 from the selector 46, i.e. stores run data for each line, which includes the determination result of the determination table 45 concerning runs on the first and second lines, the start point coordinates of an integrated region of the runs, the size of the region, etc. For example, while the comparators 43a–43e perform comparison processing concerning runs on the first and second lines, the memory 47 stores the start point coordinates and the size of the region formed by integrating the runs, or run data concerning the run on the second line when the runs on the first and second lines are not connected to each other, etc. Accordingly, where the runs are connected to each other, the size, etc. of the integrated region including the connected runs are updated each time the line to be processed is shifted from one to another.

The memory 48 stores data on labels obtained by the determination of the determination table 45 which is performed on the basis of runs included in one image (one page of an image document), i.e. data on rectangles which circumscribe labels each formed of an integrated region including connected runs. If the determination table 45 determines that the runs are not connected to each other, it also determines that a run-integrated label has been extracted, and the start point coordinates and the size of a rectangle which circumscribes the extracted label are stored in the memory 48 in the form of the table shown in FIG. 15.

The run selection signal S38 is used, at the time of updating data to be compared by the comparators 43a–43e and data to be subjected to calculation using the adder-subtracter 44, to determine which one of run data concerning the first line (which is stored in the memory 41 and output as the signal S41) and run data concerning the second line (which is indicated by the run expansion signal S2) should be updated. For example, if the run selection signal S38 is "0" (i.e. if the determination table 45 determines that the third, the fifth or the sixth determination conditions are satisfied), the run data concerning the first line (the signal S41) is updated as data to be compared and subjected to addition/subtraction. If, on the other hand, the run selection signal S38 is "1" (i.e. if the determination table 45 determines that the first, the second and the fourth determination conditions are satisfied), the run data concerning the second line (the run expansion signal S2) is updated as data to be compared and subjected to addition/subtraction.

The selector 42 outputs the run data concerning the first line (the signal S41) stored in the memory 41 when the selection signal S36 is "1" to indicate that the run connection has been completed, and outputs label data (the signal S42) supplied from the selector 46 when the selection signal S36 is "0". In accordance with the output of the selector 42, data in the comparators 43a–43e and in the adder-subtracter 44 are updated.

The above-described processing is repeated till the end of the first line. When the first line has been all processed, run data concerning the second line (a signal S47) stored in the memory 47 is stored in the memory 41 via the selector 40. Thereafter, the above-described processing is performed for run data concerning the second line (the signal S41) and run data concerning a third line (the run expansion signal S2). Thus, the same processing is repeated till the end of one page.

As a result of the above-described processing, the memory 48 stores data on labels extracted from one page of the image document, i.e. data on rectangles which circumscribe the labels each formed by integrating connected runs (the start point coordinates and the sizes of the rectangles as shown in FIG. 15).

Then, the determination means 5 determines the type of each region (label) extracted in the form of a circumscribing rectangle, on the basis of the circumscribing-rectangle data S4 stored in the memory 48. The determination is performed in a manner described below.

Supposing, for example, the x-directional and y-directional lengths of each label are Xs and Ys, respectively, an appropriate limitation is set for the size of a text region in light of the feature that the text region is long and narrow. Specifically, it is determined that the region is the text region if the following formulas are satisfied:

$Ta < Xs < Tb$ and $Tc < Ys < Td$ where Ta, Tb, Tc and Td represent appropriate threshold values. Also at the time of determining a continuous (photograph) region, an appropriate limitation is set and another threshold value is used for determination.

Although in the embodiment, the type of the region is determined on the basis of the size of the extracted label, the determination can be also performed by detecting the density of each black pixel included in a label, the number of portions of the label wherein black and white pixels are located adjacent to each other, or the average density in the label. Moreover, on the basis of these data items, a continuous region and a half-tone region can be determined, as well as the text region.

On the basis of the determination result (signal S5) in the determination means 5, image processing suitable to each image region is performed in the following processing or in the following image processing unit, thereby creating a high quality duplicate image, etc.

In summary, the invention can provide an image processing apparatus capable of extracting accurate image regions having different features (such as a text, a photograph, etc.) from a to-be-processed image, and easily determining the types of the image regions, thus performing image processing with high accuracy.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image processing apparatus comprising: means for binarizing the pixel value of each of target pixels included in an image to be processed, on the basis of a threshold value selected from a plurality of preset threshold values, so as to maintain the gradation of a gradation image component included in the to-be-processed image;

means for expanding black pixels on the basis of each binary target pixel and binary black pixels located around the target pixel;

means for integrating, into an integrated region, a plurality of black pixel regions each obtained by expanding the black pixels by means of the expanding means;

means for extracting a circumscribing rectangle which circumscribes each integrated region formed by integrating means; and means for determining the type of an image component included in an integrated region circumscribed by each circumscribing rectangle extracted by the circumscribing-rectangle extraction means, on the basis of features of the circumscribing rectangle.

2. The image processing apparatus according to claim 1, wherein the binarizing means has means for correcting the pixel value of each target pixel using a correction amount determined on the basis of the pixel value of each of pixels located around the target pixel, and binarizing the corrected pixel value using a predetermined threshold value.

3. The image processing apparatus according to claim 1, wherein the binarizing means has means for correcting the pixel value of each target pixel on the basis of the difference between the pixel value and the binarized pixel value of a pixel scanned immediately before the target pixel, and binarizing the corrected pixel value using a predetermined threshold value.

4. The image processing apparatus according to claim 1, wherein the binarizing means has means for binarizing the pixel value of each target pixel on the basis of a threshold value generated at random within a predetermined range.

5. The image processing apparatus according to claim 1, wherein the binarizing means has means for dividing the to-be-processed image into blocks which are each constituted by a matrix, and applying a matrix constituted by predetermined threshold values to each block, thereby to binarize the to-be-processed image.

6. The image processing apparatus according to claim 1, further comprising calculation means for calculating the average pixel value of pixels included in a predetermined region wherein each target pixel is included, wherein the binarizing means has means for binarizing the target pixel using, as a threshold value, an average value calculated by the calculation means.

7. The image processing apparatus according to claim 1, wherein the image determination means has means for determining the type of the image component included in the integrated region circumscribed by each circumscribing rectangle extracted by the circumscribing-rectangle extraction means, on the basis of the size and the configuration of the circumscribing rectangle.

* * * * *